United States Patent [19]

Bellinger et al.

[11] Patent Number: 4,895,639

[45] Date of Patent: Jan. 23, 1990

[54] SUPPRESSING SEDIMENT FORMATION IN AN EBULLATED BED PROCESS

[75] Inventors: Michael P. Bellinger; Scott M. Sayles, both of Baton Rouge, La.

[73] Assignee: Texaco, Inc., White Plains, N.Y.

[21] Appl. No.: 321,112

[22] Filed: Mar. 9, 1989

[51] Int. Cl.$^4$ .......................................... C10G 13/02
[52] U.S. Cl. ................................... 208/149; 208/127; 208/146; 208/153; 208/160; 208/161; 208/163; 208/143; 208/108
[58] Field of Search ............... 208/127, 149, 153, 160, 208/161, 163, 143, 146, 108

[56] References Cited

U.S. PATENT DOCUMENTS

| | | | |
|---|---|---|---|
| Re. 25,770 | 4/1965 | Johanson | 208/143 |
| 2,987,465 | 6/1951 | Johanson | 208/149 |
| 3,151,060 | 9/1964 | Garbo | 208/143 |
| 3,635,943 | 1/1972 | Stewart | 208/143 |
| 3,681,231 | 8/1972 | Alpert et al. | 208/48 A A |
| 3,725,247 | 4/1973 | Johnson et al. | 208/111 |
| 3,887,455 | 6/1975 | Hammer et al. | 208/112 |
| 4,446,002 | 5/1984 | Siegmund | 208/23 |
| 4,808,298 | 2/1989 | Peck et al. | 208/212 |

Primary Examiner—Helane Myers
Attorney, Agent, or Firm—Jack H. Park; Kenneth R. Priem; Richard A. Morgan

[57] ABSTRACT

In an ebullated bed process, a residual hydrocarbon oil and a hydrogen containing gas is passed upwardly through an ebullated bed of catalyst in a hydrocracking zone at a temperature in the range of 650° F. to 950° F. and pressure of 1000 psia to 5000 psia. FCCU catalyst fines are added to the ebullated bed in an amount of 15 wt % to 21 wt % of total catalyst comprising hydrocracking catalyst and fines. A hydrocracked oil is recovered characterized by having a reduced sediment content.

10 Claims, No Drawings

SUPPRESSING SEDIMENT FORMATION IN AN EBULLATED BED PROCESS

BACKGROUND OF THE INVENTION

1. Field of the Invention

This invention relates to an improved ebullated bed hydrocracking process. In the improved process fluid catalytic cracking catalyst fines are introduced into the reactor and as a result sediment formation in the hydrocracked product oil is reduced.

2. Description of Other Relevant Methods in the Field

The ebullated bed process comprises the passing of concurrently flowing streams of liquids or slurries of liquids and solids and gas through a vertically cylindrical vessel containing catalyst. The catalyst is placed in random motion in the liquid and has a gross volume dispersed through the liquid medium greater than the volume of the catalyst when stationary. The ebullated bed process has found commercial application in the upgrading of heavy liquid hydrocarbons such as vacuum residuum or atmospheric residuum or converting coal to synthetic oils. The ebullated bed process is generally described in U.S. Pat. No. Re. 25,770 issued Apr. 27, 1965 to E. S. Johanson incorporated herein by reference.

U.S. Pat. No. 3,681,231 to S. B. Alpert et al. discloses an ebullated bed process for the production of fuels such as diesel oil. A crude feedstock and an aromatic diluent is passed to an ebullated bed at a temperature of 600° F. to 900° F., pressure of 500 to 5000 psig and a hydrogen partial pressure in the range of 65% to 95% of total pressure. It was found that 20 to 70 vol % of an aromatic diluent having a boiling point in the range of 700° F. to 1000° F. (heavy gas oil) injected in the feed reduced the amount of insoluble material in the product.

U.S. Pat. No. 4,446,002 to C. W. Siegmund teaches a process for suppressing the precipitation of sediment in unconverted residuum obtained from a virgin residuum conversion process. The process comprises blending the unconverted residuum with an effective amount of a virgin residuum.

U.S. Pat. No. 3,725,247 to A. R. Johnson et al. teaches hydrogenation of residuum in an ebullated bed process. In the drawing is shown two methods of catalyst addition. In the first method, catalyst is added to the ebullated bed with the feed and in the second method catalyst is added by means of a discrete catalyst loading system.

SUMMARY OF THE INVENTION

The invention is an improvement in an ebullated bed process which hydrocracks a residual hydrocarbon oil in the presence of a hydrocracking catalyst. The process comprises passing the residual oil and a hydrogen-containing gas upwardly through a zone of ebullated hydrogenation catalyst at a temperature of 650° F. to 950° F. The pressure is about 1000 psia to 5000 psia and space velocity is 0.05 to 3.0 volume of residual oil per hour per volume of reactor.

In the process, the hydrogen-containing gas and residual oil are introduced into the lower end of a vertical reaction vessel wherein the catalyst is placed in random motion within the oil and the catalyst bed is expanded to a volume greater than its static volume. The mixture of residual oil, gas and catalyst comprises a turbulent zone from which aged, carbon containing catalyst is removed and fresh, low carbon catalyst is added. The upper portion of the turbulent zone is defined by an interface with a substantially catalyst depleted zone from which hydrocracked product is removed.

In the improved process, fluid catalytic cracking catalyst fines are introduced into the zone of ebullated hydrogenation catalyst. A hydrocracked oil product reduced in sediment content is recovered.

DETAILED DESCRIPTION OF THE INVENTION

A high boiling range residual hydrocarbon oil derived from petroleum or coal sources, is catalytically hydrotreated in the presence of relatively large volumes of hydrogen which results in hydrocracking of the oil to fuel boiling range products as well as hydrodesulfurization and metals removal. Hydrocarbon oils particularly susceptible to this catalytic hydrotreatment include vacuum residuum, atmospheric residuum, heavy gas oils, coker gas oils, high gravity crude oils and other high boiling hydrocarbon oil fractions.

These high boiling range hydrocarbon oils contain relatively large quantities of pentane insoluble asphaltenes. These asphaltenes readily polymerize at the high reactor temperatures of the ebullated bed process causing plugging of catalyst pores and preventing fresh hydrocarbon oil from coming in contact with active catalyst sites. The rapid deactivation of catalyst in the ebullated bed process has been attributed to these asphaltenes. Furthermore, the plugging of downstream equipment is attributed to polymerized sediment.

An anomaly has been discovered in the ebullated bed hydrocracking process. It was discovered that feedstocks containing higher amounts of fluid catalytic cracking fines were hydrocracked to a product oil containing less total sediment than feedstocks containing lower amounts or free of catalyst fines.

The mechanism of the invention is not known with mathematical certainty. It is postulated that active metals on FCCU catalyst fines promote cracking or hydrogenation of multiring sediment forming components at ebullated bed hydrocracking conditions. Though the fines are measured in the Shell Hot Filtration Test (SHFT) as sediment, they decrease sediment production enough to cause a net reduction in total sediment in the product oil.

Commercial cracking catalysts for use in a fluidized catalytic cracking process have been developed to be highly active for conversion of relatively heavy hydrocarbons into naphtha, lighter hydrocarbons and coke and demonstrate selectivity for conversion of hydrocarbon feed, such as vacuum gas oil, to a liquid fuel fraction at the expense of gas and coke. One class of such improved catalytic cracking catalysts includes those comprising zeolitic silica-alumina molecular sieves in admixture with amorphous inorganic oxides such as silica-alumina, silica-magnesia and silica-zirconia. Another class of catalysts having such characteristics for this purpose include those widely known as high alumina catalysts.

These catalysts have an average size of about 75 to 90 microns. In the process, particularly in regeneration, the catalyst becomes reduced in size. When the size is reduced to about 40 microns or less the catalyst is no longer useful in the fluidized catalytic cracking process. The term catalyst fine is defined herein as catalyst of initial larger size which has been broken or otherwise reduced in a size to about 40 microns or less.

Preferable ebullated bed catalyst comprises active metals, for example Group VIB salts and Group VIIIB salts on an alumina support of 60 mesh to 270 mesh having an average pore diameter in the range of 80 to 120 Angstroms and at least 50% of the pores having a pore diameter in the range of 65 to 150 Angstroms. Alternatively, catalyst in the form of extrudates or spheres of ¼ inch to 1/32 inch diameter may be used. Group VIB salts include molybdenum salts or tungsten salts selected from the group consisting of molybdenum oxide, molybdenum sulfide, tungsten oxide, tungsten sulfide and mixtures thereof. Group VIIIB salts include a nickel salt or cobalt salt selected from the group consisting of nickel oxide, cobalt oxide, nickel sulfide, cobalt sulfide and mixtures thereof. The preferred active metal salt combinations are the commercially available nickel oxide-molybdenum oxide and the cobalt oxide-molybdenum oxide combinations on alumina support. The oxide form of the catalyst is converted to the sulfide on contact with sulfur containing feedstocks at ebullated bed cracking conditions.

This invention is shown by way of Example.

EXAMPLE

Ex. 1

Base level data was measured in a commercial scale ebullated bed unit. Fresh ebullated bed hydrocracking catalyst was added to the bed by means of a discrete catalyst addition apparatus. With no FCCU (fluid catalytic cracking unit) catalyst fines in the bed, the monthly average sediment in the fractionator bottoms was 0.30 wt % to 0.42 wt % by the Shell Hot Filtration Test (SHFT—Shell Method Series 2696-83).

Ex. 2

Equilibrium (used) FCCU catalyst fines were added to the ebullated bed with 12 vol % of a less sediment yielding feedstock in an amount of 15 wt % of total catalyst. The monthly average sediment of the fractionator bottoms dropped from 0.30 wt % to 0.15% wt %. The FCCU fines accounted for 0.028% of the 0.15 wt % total sediment.

Ex. 3

The next month on a more sediment yielding feedstock than Ex. 1, sediment by SHFT increased to an average of 0.272 wt % with the same catalyst proportion as Ex. 2. Catalyst fines in the sediment remained constant at 0.028 wt %. The FCCU fines were then increased to 21 wt % of total catalyst addition and the sediment by SHFT dropped to 0.072 wt %. Catalyst fines are determined to be 0.067%, almost the entire sediment content.

We expected the amount of sediment to increase by the amount of catalyst fines added. Instead sediment decreased. At 21 wt % fines, the catalyst fines comprised most of the measured sediment.

These observations have led us to the conclusion that FCCU catalyst fines reduce sediment. Amounts above 2 wt % FCCU catalyst caused high pump seal wear. As shown in the Example, almost all polymer sediment was eliminated with about 21 wt % FCCU fines. Amounts below about 15 wt % FCCU catalyst were not tested, but were anticipated to demonstrate reduced effectiveness.

While particular embodiments of the invention have been described, it will be understood, of course, that the invention is not limited thereto since many modifications may be made, and it is, therefore, contemplated to cover by the appended claims any such modifications as fall within the true spirit and scope of the invention. For example, it is understood that at steady state, the relative proportion of FCCU catalyst fines in the ebullated bed are the same as the proportion in the fresh catalyst added to the ebullated bed. Both spent and fresh catalyst fines are understood to be within the scope of the invention.

What is claimed is:

1. An improved continuous process for treating a fluid hydrocarbon feedstock with a hydrogen-containing gas at elevated catalytic reaction temperatures and pressures in the presence of a bed of hydrocracking catalyst, said process comprising introducing the hydrogen-containing gas and feedstock into the lower end of a generally vertical catalyst containing reaction vessel wherein the catalyst is placed in random motion within the fluid hydrocarbon whereby the catalyst bed is expanded to a volume greater than its static volume, wherein the mixture of feedstock, gas and catalyst constitutes a turbulent zone from which zone aged, carbon containing catalyst is removed and fresh hydrocracking catalyst reduced in carbon is added, the upper portion of which turbulent zone is defined by an interface with a substantially catalyst depleted zone from which zone hydrocracked product is removed, wherein the improvement comprises:

adding fluid catalytic cracking catalyst fines of a size of 40 microns or less to the bed of hydrocracking catalyst in an amount of up to 25 wt % of total catalyst, and recovering a hydrocracked product reduced in sediment.

2. The process of claim 1 wherein the fluid catalytic cracking catalyst fines are added in an amount of 15 wt % to 21 wt % of the sum of fresh hydrocracking catalyst and fluid catalytic cracking catalyst fines.

3. The process of claim 1 wherein the fines are derived from equilibrium catalyst.

4. A continuous process for treating a fluid hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel wherein the catalyst is placed in random motion within the fluid hydrocarbon whereby the catalyst bed is expanded to a volume greater than its static volume, wherein the mixture of feedstock, gas and catalyst constitutes a turbulent zone from which zone aged, carbon containing catalyst is removed and fresh catalyst reduced in carbon is added, the upper portion of which turbulent zone is defined by an interface with a substantially catalyst depleted zone from which zone hydrocracked product is removed, wherein the catalyst comprises:

a mixture of hydrocracking catalyst in a major proportion and fluidized catalytic cracking catalyst fines of a size of 40 microns or less in an amount of up to 25 wt % of the mixture.

5. The process of claim 4 wherein the fluid catalytic cracking catalyst fines comprise 15 wt % to 21 wt % of the mixture.

6. The process of claim 4 wherein the fines are derived from equilibrium catalyst.

7. A continuous process for treating a fluid hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel wherein the catalyst is placed in random motion within the fluid hydrocarbon whereby the catalyst bed is expanded to a volume greater than its static volume, wherein the mixture of feedstock, gas and catalyst constitutes a turbulent zone from which zone aged, carbon containing catalyst is removed and fresh catalyst reduced in carbon is added, the upper portion of which turbulent zone is defined by an interface with a substantially catalyst depleted zone from which zone hydrocracked product is removed, wherein the catalyst comprises:
  a mixture of hydrocracking catalyst in a major proportion and fluid catalytic cracking catalyst fines in a minor proportion of up to 25 wt % of the mixture wherein said hydrocracking catalyst comprises a group VIB salt selected from the group consisting of molybdenum oxide, molybdenum sulfide, tungsten oxide, tungsten sulfide and mixtures thereof and a Group VIIIB salt selected from the group consisting of nickel oxide, nickel sulfide, cobalt oxide, cobalt sulfide and mixtures thereof said Group VIB salt and Group VIIIB salt on an alumina support selected from the group consisting of an alumina support of 60 to 270 mesh, extrudates of ¼ to 1/32 inch diameter and spheres of ¼ to 1/32 inch diameter, and wherein said fluid catalytic cracking catalyst fines are of a size of 40 microns or less.

8. The process of claim 7 wherein the fluid catalytic cracking catalyst fines comprise 15 wt % to 21 wt % of the catalyst mixture.

9. The process of claim 7 wherein the fluid catalytic cracking catalyst fines comprise zeolitic silica-alumina molecular sieve.

10. The process of claim 7 wherein the fluid catalytic cracking catalyst fines comprise high alumina catalyst.

* * * * *

UNITED STATES PATENT AND TRADEMARK OFFICE
CERTIFICATE OF CORRECTION

PATENT NO. : 4,895,639

DATED : January 23, 1990

INVENTOR(S) : Michael Peter Bellinger and Scott Michael Sayles

It is certified that error appears in the above-identified patent and that said Letters Patent is hereby corrected as shown below:

Col. 3, line 62, delete "2" and insert therefor --25--.

Signed and Sealed this

Fifteenth Day of January, 1991

Attest:

HARRY F. MANBECK, JR.

*Attesting Officer*  *Commissioner of Patents and Trademarks*